United States Patent [19]

Fischer et al.

[11] Patent Number: 4,609,511
[45] Date of Patent: Sep. 2, 1986

[54] RELEASE AGENT AND PROCESS PERFORMABLE THEREWITH FOR THE PRODUCTION OF POLYURETHANE FOAM

[75] Inventors: Wolfgang Fischer, Murlenbach; William Krug, Heidelberg, both of Fed. Rep. of Germany

[73] Assignee: W. R. Grace & Co., Lexington, Mass.

[21] Appl. No.: 819,465

[22] Filed: Jan. 15, 1986

Related U.S. Application Data

[63] Continuation of Ser. No. 707,370, Mar. 1, 1985, abandoned.

[30] Foreign Application Priority Data

Mar. 16, 1984 [DE] Fed. Rep. of Germany ....... 3410219

[51] Int. Cl.$^4$ ............................................. C08G 18/14
[52] U.S. Cl. .................... 264/51; 106/38.22; 106/38.24; 106/38.25; 252/311; 252/312; 264/39; 264/53; 264/54; 521/51
[58] Field of Search .............. 106/38.22, 38.24, 38.25; 252/311, 312; 264/39, 51, 53, 54; 521/51

[56] References Cited

U.S. PATENT DOCUMENTS

| | | | |
|---|---|---|---|
| 2,514,296 | 7/1950 | Small et al. | 252/33.3 |
| 3,413,390 | 11/1968 | Heiss | 264/54 |
| 3,423,503 | 1/1969 | York | 264/338 |
| 3,929,499 | 12/1975 | Thomas | 106/38.25 |
| 3,992,502 | 11/1976 | Krishnan | 264/129 |
| 4,028,120 | 6/1977 | Edmond | 106/38.25 |
| 4,110,397 | 8/1978 | Wooler | 264/338 |
| 4,130,698 | 12/1978 | Sparrow et al. | 521/130 |
| 4,131,662 | 12/1978 | Cekoric et al. | 264/51 |
| 4,172,870 | 10/1979 | Whitchurch | 264/51 |
| 4,184,880 | 1/1980 | Huber et al. | 106/38.24 |
| 4,312,672 | 1/1982 | Blahak et al. | 106/38.22 |
| 4,331,736 | 5/1982 | Schafer et al. | 428/425.6 |
| 4,473,403 | 9/1984 | Wesala | 106/38.24 |

FOREIGN PATENT DOCUMENTS

| | | |
|---|---|---|
| 1816453 | 6/1970 | Fed. Rep. of Germany . |
| 113715 | 6/1975 | Fed. Rep. of Germany . |
| 2630846 | 1/1978 | Fed. Rep. of Germany . |
| 2637919 | 3/1978 | Fed. Rep. of Germany . |
| 2805951 | 8/1979 | Fed. Rep. of Germany . |
| 1386674 | 12/1964 | France . |
| 1193882 | 6/1970 | United Kingdom . |
| 2081637 | 7/1984 | United Kingdom . |

OTHER PUBLICATIONS

West German Patent Office Search dated Feb. 25, 1985 issued in corresponding German Patent Application 34 10 219.1.
European Patent Office Search dated Dec. 18, 1985 issued in corresponding European Patent Application 85102779.7
Plastics Technology, vol. 63, 1965, col. 13518.
Comments to References cited by German Examiner.

*Primary Examiner*—Maurice J. Welsh
*Attorney, Agent, or Firm*—Bart G. Newland; William L. Baker

[57] ABSTRACT

A release agent is described, which is suitable for the production of polyurethane foam articles in molds. It is an aqueous emulsion or dispersion of per se known release-effective substances as well as optionally conventional additives, having a water content of at least 60% by weight and preferably 85 to 96% by weight, the water being masked through the effect of lyotropic mesomorphism. Masking and immobilizing the water molecules avoids that the water molecules have a prejudicial effect of the polyol/isocyanate reaction, and is preferably achieved by the combined use of release-effective substances and suitable masking aids. As suitable masking aids especially fatty alcohol polyglycol ethers and ethoxylated fatty alcohols are proposed. The polyurethane articles obtained while using the above described release agent fulfil the standard quality requirements without any of the disadvantageous effects on the environment such as occur with conventional release agents.

9 Claims, No Drawings

RELEASE AGENT AND PROCESS PERFORMABLE THEREWITH FOR THE PRODUCTION OF POLYURETHANE FOAM

This is a continuation of copending application Ser. No. 707,370 filed on Nov. 1, 1985 now abandoned.

BACKGROUND OF INVENTION

The invention relates to a release agent, which is suitable for the production of polyurethane foam articles in molds and which can be used in processes for producing such articles.

Polyurethane foam articles are produced in molds and the most varied prior art processes can be used for this process. The Expert is aware of a large number of possible variants both with regard to the foam-forming components which can be used and with regard to the equipment and molds which can be used. Generally the mold is filled either in its open or closed state through an injection channel with the polyol and isocyanate components mixed by means of a mixing head. Apart from the sought product and its desired properties, the composition of the components is decided by whether a single-stage process (direct process) or a two-stage process (prepolymer process or semiprepolymer process) is to be used. All these different possible procedures are described in detail in the literature, so no detailed description need be given thereof. Reference is for example made to "Integral-schaumstoffe", Piechota and Röhr, 1975; Kunststoff Handbuch, Vol. VII, "Polyurethane", 1966; "Schaumkunststoffe", published by Fachverband Schaumkunststoffe in GKV, 1976; and Wittfoht, Kunststoff-Technisches Wörterbuch, part 3.

For the purpose of an easier and cleaner removal of the polymerized foam articles it is necessary to treat the mold with a release agent (mold release agent) before it is filled. For this purpose, the mold surfaces are uniformly coated with a release agent in order to produce a release film. Apart from leading to good mold release characteristics, in certain cases the release agent must also be able to influence the surface characteristics of the finished polyurethane articles. Thus, as a result of certain additives, e.g. in the cold soft foam sector (seats, headrests, armrests, etc. in cars) an open-cell structure is produced and consequently the necessary "breathability" of the foam article.

Conventional release agents consist of organic solvents and release-effective substances dispersed therein, which are referred to in their entirety as solids. As a function of the intended use, the solid proportion consisting of waxes, greases (long chain hydrocarbons), fats (triglycerides such as beef tallow), silicone compounds, plasticizers, stabilizers, accelerators, etc. varies between 1 and 8% by weight. The proponderant proportions of solvents in the parting compound, such as e.g. Frigen, methylene chloride, trichloroethylene, perchloroethylene, gasolines and high-boiling petroleum hydrocarbons serve as carriers, so that the release effective substances can be applied to the mold surfaces in the form of a uniform release film. Whereas halogenated hydrocarbons exclusively fulfil a vehicle function, the gasoline proportion leads to a uniform flow of the release agent film, which also has a positive influence on the release action.

The solids composition, solids proportion and solvent combination are decided as a function of the mold temperature, the airing time (time between release agent application and component injection) and the particular foam system (integral, rigid integral or soft cold foam). As a result the most varied articles with very varying characteristics can be produced. Thus, for example, integral foam can be used for producing steering wheels for cars, where special requirements are made on the surface (uniformity and good gripping properties). During the production of the integral foam, the mold temperature is generally between 30 and 50° C. However, in the RIM process (RIM foam), frequently used for the production of polished moldings, the mold temperature is 50° to 70° C. Similar temperatures, namely in the range 40° to 70° C., are exhibited by molds when producing articles from cold soft foam such as seats, headrests and arm rests for cars. The mold temperature is generally 30° to 50° C. when producing rigid foam articles, such as car brackets, window shutters, refrigerator components, furniture parts and chairs.

On applying the release agent, which generally involves using an airless spraying device, the solvents largely evaporate as an azeotropic mixture from the mold surface heated to between 25° and 70° C. as a function of the particular foam system. Together with the overspray, these vapours are removed from the working area by corresponding suction equipment. Apart from the loss of valuable raw materials, these pollutant emissions are prejudicial to the environment. Recycling processes would be conceivable with adsorption installations, but a serious problem is posed by the solids in finely divided form, which cannot be eliminated by means of filters or water walls. The adsorption coatings immediately covered with wax and grease would have to be regenerated in very short time, which would involve a large amount of labour and high costs.

It is known that the aforementioned problems can be avoided in a few fields (hot foam, modified integral foam in the case of underfoaming processes) through the use of a release agent, whose organic solvents are largely replaced by water. These are wax dispersions or emulsions, whose use has been very limited up to now with regard to the surface characteristics of the foam articles. In addition, long airing times are required in connection with the aforementioned foam production processes and the mold temperatures employed, so that their use in industrial mass production is uninteresting from the economic standpoint. Apart from the unfavourable evaporation behaviour and inadequate film formation, the main reason for the above limitation in connection with aqueous release agent systems is the competing reaction between water and isocyanate groups ($R-N{=}C{=}O + H_2O \rightarrow R-NH_2 + CO_2$), which runs parallel to the polyol - isocyanate reaction and liberates carbon dioxide, whilst partially shifting the precisely defined polyol/isocyanate ratio. This leads to foam results in the form of discolourations, bubbles, voids (blisters) and even partial foam collapse. Moreover, on injecting the foam-forming components by means of the injection channel there is an intimate mixing of the components with the release agent in said channel. Here shrinkage phenomena can be observed as another disturbance.

In addition, largely aqueous release agents are known, but, apart from water, they contain considerable proportions of low-boiling, water-soluble alcohols, ketones, esters, etc. as evaporation accelerators. Although these components reduce the long evaporation times required with aqueous release agents, they do not prevent the aforementioned reaction between water and isocyanate. Moreover, these water-soluble evaporation accelerators are still highly prejudicial to the environment.

As a result of the aforementioned disadvantages, aqueous release agents of the aforementioned types, which generally contain considerable solubilizer proportions have not as yet been adopted for industrial use.

OBJECTS OF THE INVENTION

Therefore it is an object of this invention to provide an aqueous release agent based exclusively on a water-solvent system, which is generally suitable for the production of articles made from polyurethane foams in molds and which completely prevents the environment from being harmed by organic solvent vapours, without encountering the disadvantages which have hitherto occurred with the largely aqueous release agents only used in special fields.

It is a further object of this invention to provide a process for the preparation of polyurethane foam articles which due to the use of an aqueous release agent avoids the above discussed environmental problems and additionally can be more simply performed since no precautions which are necessary when using organic solvents have to be taken.

These and further objects will become apparent as the description of the invention proceeds.

DETAILED DESCRIPTION OF INVENTION

The invention is directed to a release agent and a process performable therewith for the production of polyurethane foam articles in molds as described herein and in the dependent claims.

The release agent according to the invention is an emulsion or dispersion of per se known release-effective substances, as well as optionally conventional additives, having a water content of at least 60% by weight and preferably 85 to 96% by weight, the water being masked through the effect of lyotropic mesomorphism.

It has surprisingly been found that the prejudicial competing reaction between water and isocyanate can be suppressed, if the mobility and reactivity of the water dipole molecules is eliminated or at least decisively reduced. Such a "masking" of the water molecules is brought about through the effect of lyotropic mesomorphism. Mesophases are states of substances, which simultaneously have properties of liquids and crystalline bodies (cf. Fette und Öle, Tenside, Waschmittel, Zeitschrift für die Waschmittel-, Seifen-, Öl - und Fettindustrie, 1983, p.4). The water molecules are immobilized, so that the competing reaction between water and isocyanate is suppressed to such an extent, that it essentially no longer plays any part.

Masking of the water molecules through the effect of lyotropic mesomorphism is preferably achieved by the combined use of release-effective substances and suitable auxiliary masking agents or masking aids, i.e. by employing wax, grease, fat, petrolatum or mixtures thereof emulsified with the help of a masking aid. The terms "wax", "grease", "fat" and "petrolatum" of course also comprise mixtures of suitable waxes, greases, fats and petrolatum fractions. The term "grease" relates to long chain hydrocarbons (like those used for lubrication purposes) while the term "fat" relates to triglycerides (see above). Preferably microwaxes and petrolatum fractions thickened with an inorganic or organic thickener in combination with a masking aid are employed for immobilizing the water molecules.

Suitable masking aids have proved to be in particular surfactants with a HLB-value (according to W. C. Griffin, Journ.Soc.Cosm.Chemists, 1 (1949), 311; (1954), 249; see also e.g. Römpps Chemie-Lexikon, Vol. 3: H-L (1973), 1478 to 1479 as well as the many HLB-value tables published in the meantime) of 8 to 15, preferably 10 to 12 and on the basis of the hitherto performed tests nonionic surfactants like fatty alcohol polyglycol ethers (see below) are preferred. Particularly advantageous results have been obtained with ethoxylated fatty alcohols. Depending on the quantity ratio of fatty alcohol to water, viscous solutions up to Vaseline-like products are formed in which the water molecules anchored by means of stable bridging bonds with the ethoxylated fatty alcohol molecules are present in a three dimensional network-like, electrically neutral matrix and consequently do not cause harmful side-effects, especially on the sensitive cold soft foam. Suitable ethoxylated fatty alcohols, preferably with a degree of ethoxylation of 5 to 12 and particularly 7 to 9 are commercially available from a large number of companies as emulsifiers. Thus, a commercially available fatty alcohol ethoxylate successfully used according to the invention e.g. has a density at 50° C. of 0,91 g/cm$^3$, a melting point somewhat over 40° C., a pH-value (1% in water) of 6 to 7.5, a cloud point (DIN 53917, ° C.) (5 g in 25 g of butyl diglycol solution) of approximately 65 and a HLB-value of approximately 11. Fatty alcohols are understood to mean commercially available fatty alcohols, which generally have carbon numbers of 9 to 22 ($C_9$–$C_{22}$-fatty alcohols). Useful properties as masking aid are also provided by other ethoxylated compounds like ethoxylated nonyl phenol.

The quantity of the masking aid to be used, i.e. the quantity necessary for adequate immobilization of the water molecules, can fluctuate as a function of the masking aid and the release-effective substance used, but can easily be determined by a few tests. With regard to the ethoxylated fatty alcohols with which particularly advantageous results can be obtained, a content of 0.5 to 5% by weight and preferably 1 to 2.5% by weight, based on the total composition has proved suitable.

The release-effective substances which in combination with the masking aids serve to immobilize the water molecules are conventional release-effective substances (see hereinbefore), which are incorporated in the aqueous base with the help of the suitable masking aids optionally in combination with known emulsifiers recommended by the manufacturers. The release-effective substances already mentioned above have proved to be particularly suitable. Additionally further release-effetive substances which are known per se can be employed. In this context the known silicone release agents have to be mentioned which together with waxes and thickened petrolatum fractions result in an especially effective combination of release-effective substances.

The waxes used in preferred manner according to the invention are microwaxes with melting points between 50° and 120° C., which are known as release agents and are commercially available. These microwaxes often already contain an emulsifier.

The thickened petrolatum fractions also preferred as release-effective substance according to the invention are release agents known from the prior art and which are commercially available. They contain inorganic thickeners such as clays (e.g. bentonites, montmorillonite, etc.), highly dispersed silica, etc., or organic thickeners such as finely divided polyethylene powder, etc. The inorganic thickeners are conventionally modified with organic compounds to improve the compatibility with petrolatum. Such modified inorganic thickeners, e.g. organic montmorillonite derivatives and surface-modified highly dispersed silica, as well as a large number of organic thickeners are also commercially available, so that there is no difficulty in modifying the commercially available petrolatum-based release agents or in formulating special petrolatum-based release agents. The latter can take place by simply stirring the thickener into the petrolatum, although in some cases more homogeneous products can be obtained by using more exacting equipment, such as e.g. a three-roll mill. Particularly suitable for the purposes of the invention is e.g. a thickened petrolatum fraction, which contains as a thickener approximately 4% by weight of an organic clay derivative. However, it is also possible to use nonthickened petrolatum fractions, although this is not preferred on the basis of experience obtained up to now. Petrolatum is readily commercially available and is described in the literature (cf. e.g. Römpp, Chemie Lexikon, 7th edition, 1974, Vol. 4: M - Pk, page 2578).

The particular suitability of thickened petrolatum fractions as a constituent of the release agent according to the invention is that as a result of the Vaseline-like character thereof, they have a thixotropy effect in the release agent according to the invention, which greatly simplifies the spraying of the release agent, whilst avoiding drop formation, particularly on sloping surfaces or edges.

The per se known silicone release agents which in a preferred manner are used additionally are polysiloxanes modified with organic groups and having a structure essentially of formula

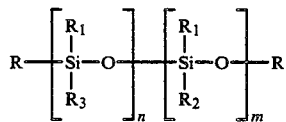

in which $R_1$ and $R_2$ are the same or different and stand for alkyl radicals (usually having not more than about 10 to 12 carbon atoms), such as methyl or ethyl radicals and/or aryl radicals such as phenyl radicals, whilst $R_3$ stands for longer side chains (usually having not more than 15 carbon atoms and mostly less than 10 or 12 carbon atoms) with OH or amino function. These longer side chains reduce the hydrophobic properties of the release agents and improve their wettability, their adhesive power and their film forming properties. R is generally also an alkyl or aryl radical, corresponding to $R_1$ and $R_2$. The sum of n and m is generally approximately 50 to 1200. For example, polydimethyl siloxanes with the hydrophobic property-reducing side chains ($R_3$) and in accordance with the above formula have proved suitable for the purposes of the invention.

The usability of the above-described silicone release agents (polysiloxanes) in the aqueous release agent according to the invention is extremely surprising, because such silicone release agents normally lead to foam collapse in aqueous systems and cannot therefore be used. Surprisingly this effect does not or only to a much lower degree occur in the matrix according to the invention. In fact, the use of this silicone release agent leads to uniformly thin release agent films by reducing the surface tension, i.e. leads to a good release agent flow without drop formation.

As a result of the combination of microwax, silicone release agent and thickened petrolatum fraction, the release agent according to the invention leads to very thin thixotropic films, so that it can even be used on integral and rigid foams.

In this context also the use of polyglycols like polyethylene glycol and especially polypropylene glycol has to be mentioned which are excellent consistency regulators and serve to make the release agent film flexible and tough. Especially with polypropylene glycol having a molecular weight in the range of about 2000 good results have been achieved. Concentrations of 0.5 to 3% by weight and preferably 1.5% by weight have proved suitable.

Further, the properties of the release agent can be improved by addition of levelling agents. For this purpose preferably nonionic fatty acid polyglycol esters are employed. They serve to reduce the surface tension of the release agent during spraying and thus help to avoid drop formation which can occur especially with cold molds and non-optimum nozzles. At the same time the fatty acid polyglycol esters preferably used as levelling agents are wax emulsifiers so that emulsification or dispersion of the waxes is promoted in case of their use. The release agent according to the invention can be produced according to conventional processes used in emulsion and dispersion technology (cf. e.g. Seifen-Öle-Fette-Wachse, Vol. 107, no. 14, 1981, pp. 391 to 402). Generally the water or at least part of the water is introduced beforehand and then the various release-effective substances, as well as optionally conventional additives for these substances are incorporated whilst using emulsifiers. The moment and the sequence of incorporating release-effective substances and masking aids can be chosen in any desired manner. Thus, the incorporation of each release-effective substance and the masking aid combined therewith can take place at the beginning, in the middle or at the end. Obviously elevated temperatures, particularly of 90° C. and higher are preferred for the purpose of facilitating the emulsification process. Even without stabilizing additives, the release agent emulsion or dispersion according to the invention has a very good stability, it being particulary advantageous that normal mains water can be used in the production thereof, i.e. the normally required deionized water need not be used.

The choice of the preferred wax used essentially depends on the process to be carried out with the release agent, i.e. the mold temperature. The higher the mold temperature, the higher must be the melting point of the wax. The emulsifier quantity (masking aid and optionally emulsifier) necessary for emulsifying the wax corresponds to the specifications of the commercially available emulsifiers for emulsifying waxes. Based on the wax quantity, the emulsifier proportion is 5 to 30% by weight, but it is necessary to take account of the influence of the emulsifier on the characteristics of the wax. Preferably the consistency of the emulsifier is as close as possible to the wax and it should only be used in small concentrations, so that the wax characteristics remain unchanged. Commercially available fatty alcohol polyglycol ethers or mixtures of fatty alcohol polyglycol ethers are, for example, suitable (see above).

A known, commercially available emulsifier is also used for the silicone release agent (polysiloxane). For example, good results are obtained with ethoxylated alkyl phenols, whilst using the quantities given in the specifications for the commercial products.

The polysiloxane to wax weight ratio is preferably approximately 1:0.5 to 1:20 and particularly 1:1 to 1:10, but can also fall outside these ranges as a function of the necessary release film flow characteristics and as a function of the chosen wax.

The pH-value of the release agent according to the invention is preferably in the neutral range, i.e. between 6 and 8. The pH-value is preferably 7. An excessively high pH-value can accelerate urethane formation, whilst a too low pH-value can delay it and both of these are undesired.

Whereas in conventional solvent-containing release agents, the solids proportion (release-effective substances) in the case of soft cold foam is between 1 and 3% by weight and in the case of underfoams between 5 and 8% by weight, it is generally higher in the case of the aqueous release agent according to the invention and can be up to approximately 15% by weight. The solids proportion naturally depends on the intended use and can be e.g. 8 to 15% by weight for under-foaming and approximately 4% by weight for cold soft foam. It is noted that in general the solids proportion in the release agent according to the invention, as a function of the intended use, is roughly twice as high as in the conventional solvent-containing release agents for the same use.

Apart from the aforementioned components, the release agent according to the invention can contain further conventional components. Thus, it is preferable to add a small amount of a biocide to the release agent. Substances can also be incorporated into the present release agent, which have a special influence on the polyurethane foam and especially the surface characteristics of the foam article. Samples of these substances include polyurethane foam stabilizers like e.g. silicone glycols, and accelerators (see above) like tin accelerators (e.g. dibutyltindilaurate) and amine accelerators (e.g. bis-(2-dimethylaminoethyl)-ether) which are also used in the prior art solvent systems. Especially the use of accelerators (usually in an amount of 0.1 to 0.3% by weight) is desirable since these accelerators preferably accelerate the polyol-isocyanate reaction at the interphase with the release agent film so that foam formation in the interphase range is quickly terminated which adds to an improved release. In order to obtain the open-cell structure (see above) which is often required in the case of cold soft foams, it is possible e.g. to incorporate commercially available glycol siloxane surfactants (silicone/glycol copolymers). These water-soluble surfactants can also be directly added to the polyol component.

At higher mold temperatures, especially in the production of cold soft foam, at temperatures of 55° to 60° C., it has also proved advantageous to use soaps, i.e. sodium or potassium oleates and/or stearates since they can at least partially substitute the microwax which in turn permits a reduction of the amount of added emulsifiers. At high temperatures like the aforementioned temperatures it is preferable to avoid excessive amounts of emulsifier since the emulsifier tends to react with the isocyanate which leads to very rigid foam products. The soaps which are advantageously used in these cases have a double function insofar as they are capable on the one hand to replace at least part of the microwax (and also others of the above disclosed release-effective substances) and at the same time to a certain degree contribute to the masking of the water molecules.

The following examples describing preferred embodiments are given for illustrative purposes only and are not meant to be a limitation on the subject invention. In all cases, unless otherwise noted, all parts and percentages are by weight.

EXAMPLE 1

A release agent consisting of the following components was prepared:

| | |
|---|---|
| Commercial microwax (emulsifier-containing) | 2.7% by weight |
| Polysiloxane | 2.0% by weight |
| Thickened petrolatum fraction | 7.88% by weight |
| Biocide | 0.1% by weight |
| Medium-high ethoxylated fatty alcohol | 1.5% by weight |
| Ethoxylated nonyl phenol (degree of ethoxylation approximately 7) | 0.4% by weight |
| Mixture of fatty alcohol polyglycol ethers | 0.32% by weight |
| Fatty alcohol polyglycol ether | 0.32% by weight |
| Water | 84.78% by weight |

10 kg of the release agent of the above composition (laboratory scale) were prepared by introducing beforehand 50% of the total water quantity and heating to 95° C. Accompanied by vigorous stirring, the aforementioned components are then successively incorporated, whilst using the in each case suitable emulsifier. Thus, the microwax was added together with the mixture of fatty alcohol polyglycol ethers and the fatty alcohol polyglycol ether (both nonionic, both with a HLB-value of approximately 10), whilst the medium-high ethoxylated fatty alcohol was introduced together with the thickened petrolatum fraction. The polysiloxane was incorporated following the prior introduction of the ethoxylated nonyl phenol. At the end with the heating system already switched off, the biocide was added. Between the additons of the aforementioned components, a sufficient time was always left to ensure that emulsification had taken place or homogeneity had been reached. The thus prepared emulsion was cooled under vigorous stirring, by cooling the vessel and adding the remaining water. When the temperature had dropped to below 40° C., the emulsion was passed through a continuous flow dispergator. The emulsion obtained had a good stability and the characteristics referred to hereinbefore.

The thus prepared release agent with a solids content of 15% by weight was used in a car factory in the production of underfoamed dashboards. An airless spraying mechanism was used to apply the release agent. The surface characteristics of the dashboards obtained met the quality requirements of the car manufacturer. Excellent results were also achieved when using this release agent for the production of articles from integral foam of different rigidity.

EXAMPLE 2

In the same way as in Example 1, a release agent with a 4% by weight solids content was prepared, but did not contain a thickened petrolatum fraction or polysiloxane. The thus prepared release agent was used in a car factory in the production of headrests from PU cold soft foam. Application once again took place by means of an airless spraying mechanism. The surface characteristics of the headrests obtained was excellent and completely comparable with headrests produced with conventional solvent-containing releases agents. There were no discolourations, voids or foam collapses. The headrests in fact had excellent quality characteristics.

EXAMPLE 3

As described in Example 1 a release agent consisting of the following components was prepared:

| Commercial microwax (emulsifier-containing) | 2.7% by weight |
|---|---|
| Polypropylene glycol (MW 2000) | 2.0% by weight |
| Thickened petrolatum fraction | 7.88% by weight |
| Biocide | 0.1% by weight |
| Ethoxylated nonyl phenol (degree of ethoxylation approximately 7) | 0.4% by weight |
| Mixture of fatty alcohol polyglycol ethers | 0.32% by weight |
| Fatty alcohol polyglycol ether | 0.32% by weight |
| Water | 86.28% by weight |

Again polyurethane foam articles of very good quality were obtained when using this release agent in tests carried out in a car factory.

EXAMPLE 4

Another release agent which were successfully used in tests and prepared in accordance with Example 1 consisted of the following components:

| Hard microwax | 1.8% by weight |
|---|---|
| Ethoxylated nonyl phenol (degree of ethoxylation approximately 7) | 0.2% by weight |
| Sodium oleate | 8% by weight |
| Fatty acid polyglycol ester (nonionic, HLB 10) | 2% by weight |
| Dibutyltindilaurate | 0.2% by weight |
| Polypropylene glycol (MW 2000) | 1% by weight |
| Water | 86.8% by weight. |

We claim:

1. A release agent suitable for the production of polyurethane foam articles in molds comprising an aqueous emulsion or dispersion of per se known release-effective substances having a water content of at least 60% by weight and preferably 85 to 96% by weight, the water being masked through the effect of lyotropic mesomorphism.

2. Release agent according to claim 1, wherein the water is masked by wax, grease, fat, petrolatum or mixtures thereof emulsified with the help of a masking aid.

3. Release agent according to claim 2, wherein the masking aid is a surfactant with an HLB-value of 8 to 15 and preferably 10 to 12 or a mixture of such surfactants.

4. Release agent according to claim 3, wherein the surfactant is a fatty alcohol polyglycol ether or a mixture of fatty alcohol polyglycol ethers or an ethoxylated fatty alcohol or a mixture of ethoxylated fatty alcohols with a degree of ethoxylation of 5 to 12 and preferably 7 to 9.

5. Release agent according to claim 2, wherein the release-effective substances are selected from microwaxes with melting points between 50° and 120° C., petrolatum fractions thickened with inorganic or organic thickeners or mixtures thereof.

6. Release agent according to claim 1, comprising additionally one or more substances selected from the group consisting of conventional silicone release agents, soaps, polyglycols, accelerators and levelling agents.

7. Release agent according to claim 2, comprising additionally one or more substances selected from the group consisting of conventional silicone release agents, soaps, polyglycols, accelerators and levelling agents.

8. Release agent according to claim 3, comprising additionally one or more substances selected from the group consisting of conventional silicone release agents, soaps, polyglycols, accelerators and levelling agents.

9. Process for the preparation of polyurethane foam articles, in which the article is produced in conventional manner by foaming in a mold, characterized in that prior to filling, the mold is treated with a release agent according to one of the claims 1 to 8.

* * * * *